United States Patent [19]

Romano

[11] Patent Number: 5,384,524
[45] Date of Patent: Jan. 24, 1995

[54] VOICE COIL MOTOR CONTROL CIRCUIT AND METHOD FOR SERVO SYSTEM CONTROL IN A COMPUTER MASS STORAGE DEVICE

[75] Inventor: Paul M. Romano, Boulder, Colo.

[73] Assignee: Cirrus Logic, Inc., Fremont, Calif.

[21] Appl. No.: 115,237

[22] Filed: Sep. 2, 1993

[51] Int. Cl.$^6$ .............................................. G05B 19/18
[52] U.S. Cl. ..................... 318/569; 318/591; 318/600; 318/626; 388/907.2; 360/105; 360/75; 369/43
[58] Field of Search ............... 318/560, 561, 567, 569, 318/590–592, 600, 626; 388/907.5, 907.2; 361/90–93; 369/43; 360/105, 75, 78.01

[56] References Cited

U.S. PATENT DOCUMENTS

| | | |
|---|---|---|
| 4,133,011 | 1/1979 | Kurzweil, Jr. . |
| 4,514,667 | 4/1985 | Sakmann et al. . |
| 4,544,968 | 10/1985 | Anderson et al. . |
| 4,564,794 | 1/1986 | Kilen et al. . |
| 4,575,776 | 3/1986 | Stephens et al. . |
| 4,578,723 | 3/1986 | Betts et al. . |
| 4,590,526 | 5/1986 | Laatt et al. . |
| 4,594,622 | 6/1986 | Wallace . |
| 4,598,327 | 7/1986 | Jen et al. . |
| 4,616,276 | 10/1986 | Workman . |
| 4,658,308 | 4/1987 | Sander, Jr. . |
| 4,669,004 | 5/1987 | Moon et al. . |
| 4,679,102 | 7/1987 | Wevers et al. . |
| 4,679,103 | 7/1987 | Workman . |
| 4,691,152 | 9/1987 | Ell et al. . |
| 4,697,127 | 9/1987 | Stich et al. . |
| 4,812,929 | 3/1989 | Stewart et al. . |
| 4,816,941 | 3/1989 | Edel et al. . |
| 4,831,469 | 5/1989 | Hanson et al. . |
| 4,831,470 | 5/1989 | Brunnett et al. . |
| 4,835,632 | 5/1989 | Shih et al. . |
| 4,835,633 | 5/1989 | Edel et al. . |
| 4,866,554 | 9/1989 | Stupek et al. ................. 360/105 |
| 4,876,491 | 10/1989 | Squires et al. . |
| 4,894,599 | 1/1990 | Ottesen et al. . |
| 4,914,644 | 4/1990 | Chen et al. . |
| 4,922,169 | 5/1990 | Freeman . |
| 4,924,160 | 5/1990 | Tung . |
| 4,928,043 | 5/1990 | Plunkett . |
| 4,933,786 | 6/1990 | Wilson . |
| 4,937,689 | 6/1990 | Seaver et al. . |
| 4,967,291 | 10/1990 | Touchton et al. . |
| 4,979,055 | 12/1990 | Squires et al. . |
| 4,979,056 | 12/1990 | Squires et al. . |
| 4,985,793 | 1/1991 | Anderson . |
| 4,992,710 | 2/1991 | Cassat . |
| 5,001,405 | 3/1991 | Cassat . |
| 5,028,852 | 3/1991 | Dunfield . |
| 5,057,753 | 10/1991 | Leuthold et al. . |
| 5,091,680 | 2/1992 | Palm . |

Primary Examiner—Jonathan Wysocki
Assistant Examiner—David Martin
Attorney, Agent, or Firm—William J. Kubida

[57] ABSTRACT

A voice coil motor ("VCM") control circuit controls operation of a VCM which positions a disk drive head-/actuator arm assembly. A data processor is continuously updated with the current position and relative radial velocity of the disk drive head/actuator arm assembly. The data processor provides signals to a digital-to-analog converter ("DAC") of the VCM control circuit representative of the amount of energy necessary to move the head/actuator arm assembly to a parking position from a current position. The DAC generates an analog signal which is applied to a capacitor. When an undervoltage condition occurs, the signal stored in the capacitor is applied to amplifier circuitry to be used as an initial condition reference signal from which signals are generated to park the head/actuator arm assembly in a desired parking position.

29 Claims, 2 Drawing Sheets

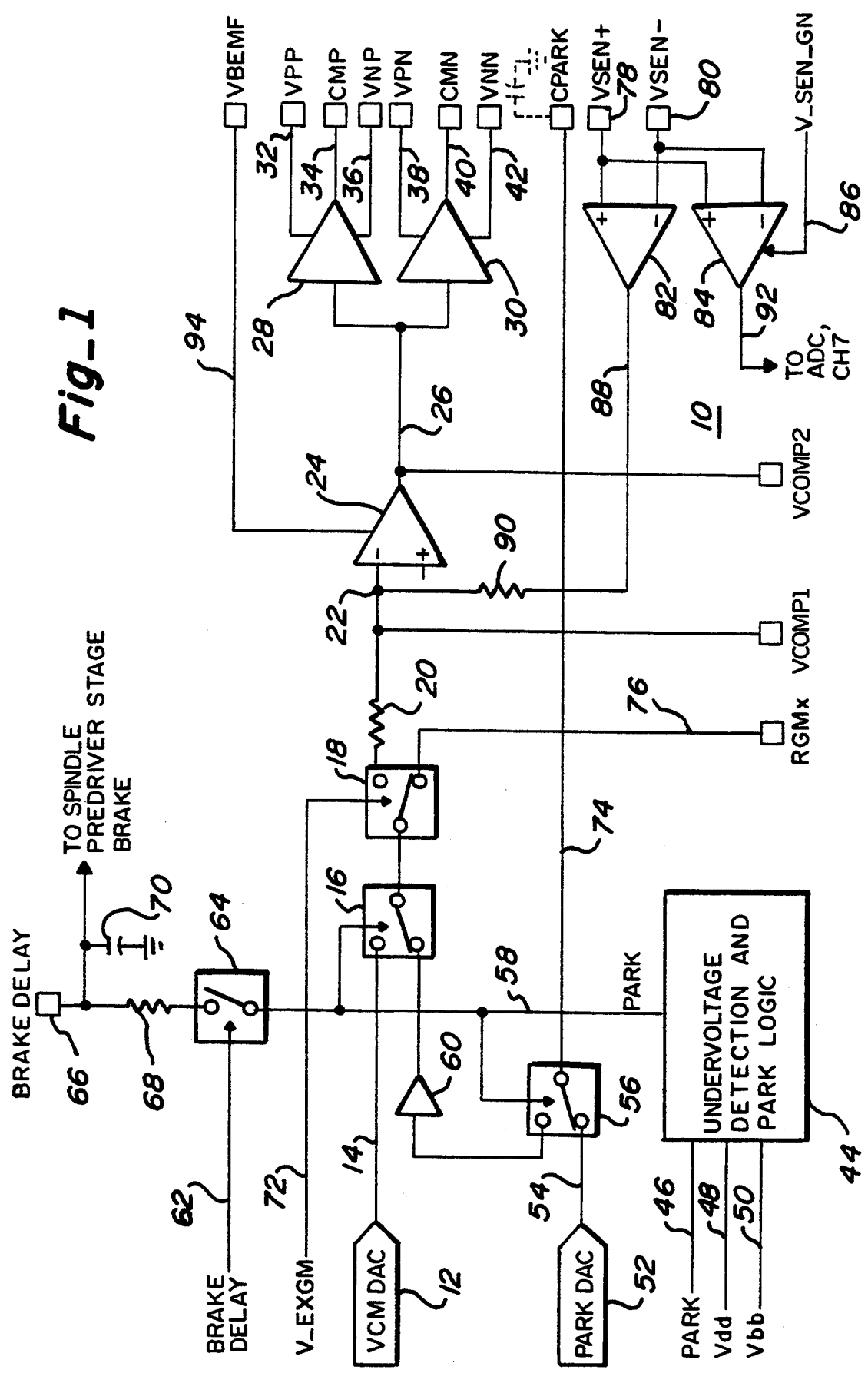
Fig_1

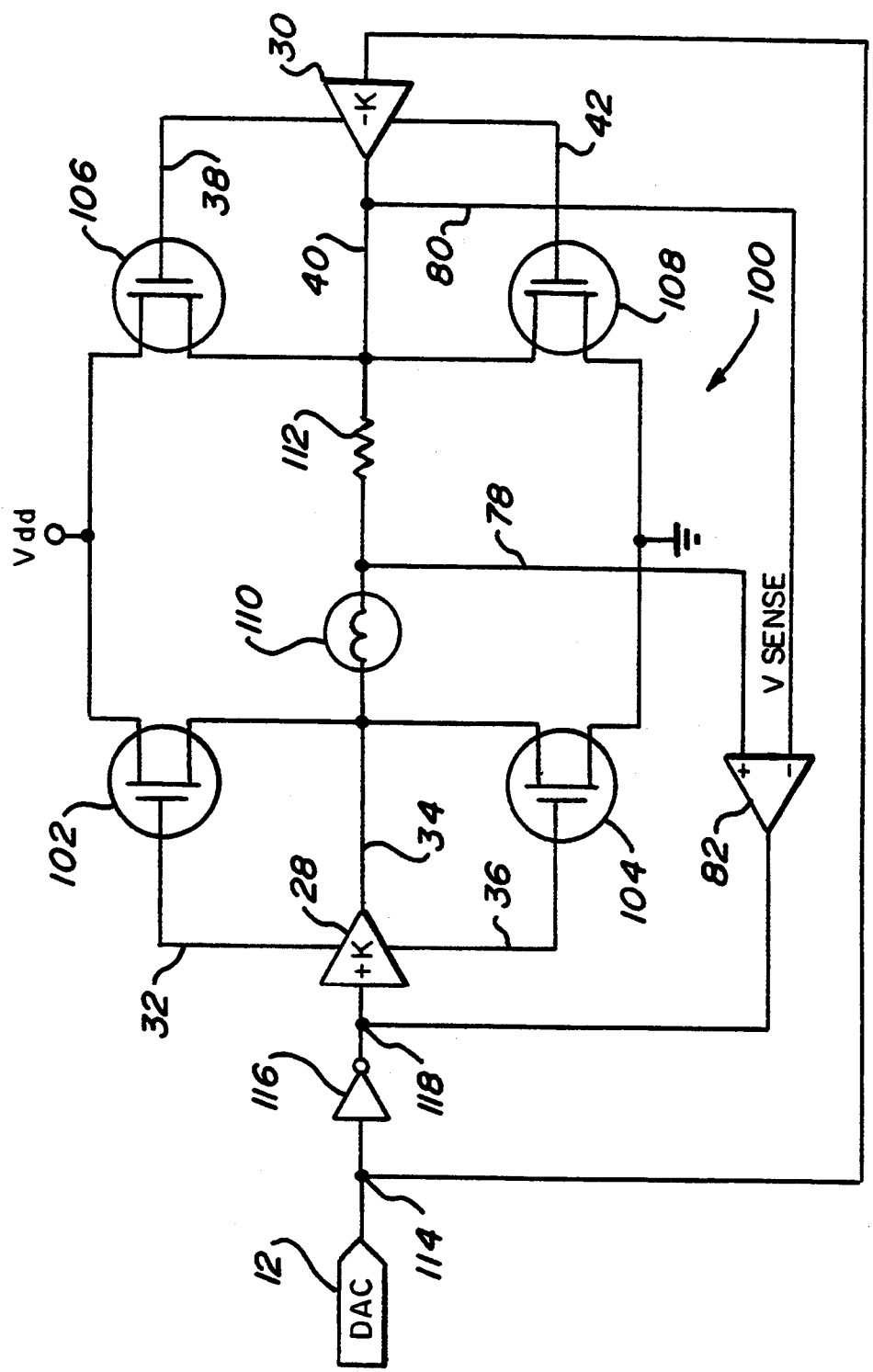
Fig_2

VOICE COIL MOTOR CONTROL CIRCUIT AND METHOD FOR SERVO SYSTEM CONTROL IN A COMPUTER MASS STORAGE DEVICE

CROSS-REFERENCE TO RELATED APPLICATION

The present invention is related to that described in U.S. patent application Ser. No. 08/115,911, for "SPINDLE MOTOR CONTROL CIRCUIT AND METHOD FOR SERVO SYSTEM CONTROL IN A COMPUTER MASS STORAGE DEVICE", filed concurrently herewith and assigned to the assignee of the present invention, the disclosure of which is hereby specifically incorporated by this reference.

The present invention is also related to those described in U.S. patent applications Ser. No. 08/071,773 for "INTEGRATED CIRCUIT TECHNIQUE FOR SERVO SYSTEM CONTROL IN A COMPUTER MASS STORAGE DEVICE"; Ser. No. 08/072,135 for "SEQUENCE, TIMING AND SYNCHRONIZATION TECHNIQUE FOR SERVO SYSTEM CONTROLLER OF A COMPUTER DISK MASS STORAGE DEVICE"; and Ser. No. 08/071,472 for "BURST COMPARISON AND SEQUENTIAL TECHNIQUE FOR DETERMINING SERVO CONTROL IN A MASS STORAGE DISK DRIVE DEVICE", all filed on Jun. 4, 1993. These related applications are also assigned to the assignee of the present invention and the disclosures thereof are hereby specifically incorporated by this reference.

The present application further incorporates by reference herein U.S. patent application Ser. No. 07/904,804 filed Jun. 25, 1992, for "DYNAMIC CONTROL OF DISK SECTORS", which is also assigned to the assignee of the present invention.

BACKGROUND OF THE INVENTION

The present invention relates, in general, to a voice coil motor control circuit for servo system control in a computer mass storage device. More particularly, the present invention relates to a voice coil motor control circuit forming part of a highly integrated, monolithic servo system controller chip of particular utility in the design and implementation of actuator or positioner control of "hard", "fixed" or "rigid" Winchester disk drives.

Disk drives are computer mass storage devices from which data may be read and/or to which such data may be written. In general, they comprise a randomly accessible rotating storage medium, or disk, on which data is encoded by various means. In magnetic disk drives, data is encoded as bits of information comprising magnetic field reversals contained on the magnetically-hard surface of the rotating disk. The bits of information are arranged serially in concentric rings called tracks, which are the curvilinear arcs described on the media surface passing by a transducer or read/write "head" whose position remains fixed for an entire revolution of the disk. Typically, disk drives will comprise multiple disks, spanned by multiple read/write heads ganged to move in unison. The collection of data tracks of all such disks corresponding to any given fixed head position is defined as a "cylinder".

The read/write head is mounted on an actuator arm which is attached to a voice coil motor capable of moving the head/arm assembly across the disk surface at very high speeds to perform seek operations. Within each track, data is usually organized into sectors of fixed length. A sector of information data may be preceded by a header and generally followed by an error correction code ("ECC"). Typically, disk controllers use the header to verify sector position before a data transfer and the ECC aids in correcting errors that may occur when data is read.

Servo control information must be available to accurately position the disk drive head over the appropriate data track. To this end, some disk drives incorporate a dedicated servo control system in which one disk, or media, surface is permanently recorded at the time of manufacture by a high precision servo writer or similar means to create a complete set of servo tracks each with a consistent pattern characteristic of a track on which it is written. The head that spans this track is then, a dedicated servo head and provides information to the position and velocity control feedback loops of the disk drive.

An alternative technique utilizes what is known as embedded servo technology which comprises embedding servo control information in the intersector gaps on the tracks of each disk surface between blocks of information data. An embedded servo system performs fine positioning of the head with respect to the track center line and continuous on track centering by reading and responding to the digital and analog information contained within the servo control sectors.

With the decreasing size or "form factor" of computer mass storage devices, particularly disk drives, there is a concomitant need to downsize the number and physical size of the associated components as well. With this trend toward ever smaller packaging, spindle motors, voice coil motor ("VCM") actuators and the like, there is an increased emphasis on reducing the power supply requirements and chip count for the associated electronics as well. At the same time, with the reduction in size of the spindle motors and actuators, ever more sophisticated control requirements are placed on the disk drive servo electronics.

Current disk drive electronic assemblies include a number of integrated circuit modules. A read/write channel and associated analog circuitry function primarily to facilitate the reading of data from and writing of data to the information data sectors of the disk. Other components provide the requisite functionality to interface the read/write channel and low level electromechanical functionality of the spindle and the actuator to a controller module. The controller module provides an interface to a host computer bus, among other things. The "low level" electromechanical functionality of the disk drive spindle motor and voice coil motor actuator for positioning the read/write heads with respect to the rotating storage media is accomplished by means of another module or subsystem which typically includes a data processor of some type, such as a digital signal processor ("DSP"), and associated microprocessor with related circuitry in the form of an application specific integrated circuit ("ASIC") and power drivers. An electronically programmable read only memory ("EPROM") containing micro instructions is typically associated with the DSP and microprocessor for use in controlling their functionality. The functionality of the read/write channel and the DSP/microprocessor module is controlled by the controller module and an associated random access memory ("RAM") which provides the host interface, buffer management, disk formatting and ECC functionality.

Current trends in the application and use of disk drives have also made it necessary to enhance the functionality of the modules and components which control smaller VCM actuators. The increased performance of computers with which the disk drives are used have placed greater demands on the disk drive to perform I/O operations more quickly and more reliably. It is also becoming increasingly desirable to provide more standardized, yet application-programmable functionality in disk drives, particularly with respect to those related to the motion control aspects of the VCM. As a consequence, it is highly desirable to provide a VCM control circuit and associated power stage which avoids the crossover distortion and "dead band" problems encountered in present designs. Moreover, it would also be highly desirable to provide a VCM control circuit which is highly integrated and capable of interfacing to a wide range of disk drive voice coil motors while simultaneously providing an effective technique for parking the actuator and heads should an undervoltage condition be detected.

SUMMARY OF THE INVENTION

A voice coil motor ("VCM") control circuit for a servo system of a computer mass storage device disk drive includes an undervoltage detection circuit for providing a park control signal in response to a supply voltage to the control circuit falling below a predetermined level. A data processor, preferably integrated with the servo system, is continuously updated with respect to the current position and relative radial velocity of the disk drive head/actuator arm assembly as positioned by the voice coil motor with respect to a parking position on the disk drive media. The data processor provides digital inputs to a digital-to-analog converter ("DAC") to produce an electrical output signal representative of the amount of energy necessary to move the head/actuator arm assembly to the parking position from its current position. In a preferred embodiment, the electrical output signal may be stored in a capacitor as an initial condition reference which is coupled to an input or the VCM control circuit in response to an undervoltage condition. The back electromotive force ("BEMF") of the disk drive spindle provides sufficient power to the voice coil motor control circuit and power proportional to the initial condition reference to the voice coil motor power stage during braking of the spindle motor to effectuate the parking operation.

An improved power stage of the present invention incorporates an effective class AB amplifier to provide improved VCM control without the cross-over distortion or "dead band" problems encountered in prior art devices.

In a particular embodiment of the present invention, a voice coil motor control circuit for a servo control system of a computer mass storage device disk drive is provided wherein the servo control system includes a data processor and a voice coil motor digital-to-analog converter responsive thereto for supplying a predetermined current level to a voice coil motor power stage to provide bidirectional positioning control to a data transducer and actuator arm assembly coupled to the voice coil motor. The voice coil motor control circuit further includes an undervoltage detection circuit for providing a park control signal indicative of a supply voltage to the voice coil motor control circuit falling below a predetermined level thereof and the servo control system provides positioner information to the data processor with respect to a current position and relative velocity of the data transducer and actuator arm assembly with respect to a parking position thereof. The present invention relates to the improvement, in combination, comprising an additional digital-to-analog converter responsive to the data processor for producing an output signal proportional to an amount of electrical energy necessary to move the data transducer and actuator arm assembly from the current position thereof to the parking position. A signal storage system is also provided for maintaining the output signal level from the additional digital-to-analog converter and supplying the output signal level to the voice coil motor control circuit in response to the park control signal.

Further disclosed is a voice coil motor power stage for a voice coil motor control circuit in a servo control system of a computer mass storage device disk drive wherein the servo control system includes a data processor and a voice coil motor digital-to-analog converter responsive thereto for supplying a predetermined current level to the voice coil motor through said voice coil motor power stage to position a data transducer and actuator arm assembly with respect to a storage medium. The voice coil motor power stage includes first and second series connected transistors coupling a first voltage line to a second voltage line having a first intermediate node therebetween and third and fourth series connected transistors in parallel with the first and second series connected transistors also coupling the first voltage line to the second voltage line and having a second intermediate node therebetween. The voice coil motor is coupled between the first and second intermediate nodes and first and second amplifiers provide a driving signal to control terminals of the first, second, third and fourth transistors as well as the first and second intermediate nodes for selectively coupling the voice coil motor between the first and second voltage lines to provide bidirectional movement thereto.

In accordance with a method of the present invention, there is disclosed a method for controlling a voice coil motor in a servo system of a computer mass storage disk drive in response to a park control signal, wherein the servo system contains positioner information with respect to a current position and relative velocity of a data transducer and actuator arm assembly positioned by the voice coil motor with respect to a storage medium. The method includes the steps of reading the positioner information, comparing the positioner information with a predetermined parking position of the data transducer and actuator arm assembly and determining an amount of energy necessary to move the data transducer and actuator arm assembly to the predetermined parking position on the storage medium from the current position thereof. The method further comprises the steps of computing a digital signal representative of the amount of energy necessary to move the data transducer and actuator arm assembly, inputting the digital signal to a digital-to-analog converter to produce an output signal proportional to the digital signal, and storing the output signal. The output signal is then applied to the voice coil motor control circuit as an initial condition reference in response to the park control signal. The power to park the actuator is derived from the BEMF of the disk drive spindle as it winds down during the parking operation.

BRIEF DESCRIPTION OF THE DRAWINGS

The foregoing and other features and objects of the present invention and the manner of attaining them will become more apparent and the invention itself will be best understood by reference to the following description of a specific embodiment thereof taken in conjunction with the accompanying drawings, wherein:

FIG. 1 is a simplified logic block diagram of a VCM control circuit in accordance with the present invention forming a portion of the servo system illustrated and described in the aforementioned co-pending applications which are incorporated by reference herein; and FIG. 2 is an additional, simplified logic block diagram of a portion of the VCM control circuit of FIG. 1 in conjunction with the power stage for driving a voice coil motor in a computer mass storage disk drive.

DESCRIPTION OF A PREFERRED EMBODIMENT

With reference to FIG. 1, a voice coil motor ("VCM") control circuit 10 in accordance with the present invention is shown. VCM control circuit 10 may form a portion of a single monolithic integrated circuit for controlling the lower level functionality of a computer mass storage disk drive as described in U.S. patent application Ser. No. 08/071,773 entitled "INTEGRATED CIRCUIT TECHNIQUE FOR SERVO SYSTEM CONTROL IN A COMPUTER MASS STORAGE DEVICE". Certain other aspects of the integrated circuit device of which VCM control circuit 10 may comprise a portion thereof are described in U.S. patent application Ser. No. 08/072,135 for "SEQUENCE, TIMING AND SYNCHRONIZATION TECHNIQUE FOR SERVO SYSTEM CONTROLLER OF A COMPUTER DISC MASS STORAGE DEVICE" and U.S. patent application Ser. No. 08/071,472 for "BURST COMPARISON AND SEQUENTIAL TECHNIQUE FOR DETERMINING SERVO CONTROL IN A MASS STORAGE DISK DRIVE DEVICE". The aforementioned United States patent applications are assigned to the assignee of the present invention and were filed on Jun. 4, 1993. The disclosure of these Applications is hereby specifically incorporated by reference herein.

VCM control circuit 10 comprises, in pertinent part, a VCM digital-to-analog convertor ("DAC") 12 as controlled by the servo system data processor, which may be a digital signal processor ("DSP"), as is more fully described in the aforementioned co-pending applications. VCM DAC 12 provides an analog output signal on VCM DAC output line 14 for input to one terminal of switching device 16. By means of switching device 16, the output signal of the VCM DAC 12 may be applied to the common terminal of switching device 18 and series connected resistor 20 to an input node 22 of amplifier 24. Amplifier 24 has a second input thereof coupled to a reference voltage source (not shown).

The output signals from amplifier 24 are applied to output signal line 26 to the inputs of amplifiers 28 and 30. Outputs from amplifier 28 appear on VPP output line 32, CMP output line 34 and VNP output line 36. VPP output line 32 provides a drive signal from amplifier 28 to the voice coil motor positive P channel gate of the power stage as will be more fully described hereinafter. CMP output line 34 provides a positive connection to the voice coil motor while VNP output line 36 provides a drive signal to the voice coil motor positive N channel gate. In like manner, VPN output line 38 provides a drive signal from amplifier 30 to the voice coil motor negative P channel gate. CMN output line 40 provides a connection to the voice coil motor negative side while VNN output line 42 provides a drive signal to the voice coil motor negative N channel gate, all as will be more fully described hereinafter.

VCM control circuit 10 also comprises an undervoltage detection and park logic circuit 44. Undervoltage detection and park logic circuit 44 receives inputs which enable the circuit to determine whether the power supply to the various aspects of the servo system, including the VCM control circuit 10, are adequate to provide continued operation of the computer mass storage device incorporating the same. Undervoltage detection and park logic circuit 44 receives a park input 46 by which other elements, including the data processor of the servo system, can command the undervoltage detection and park logic circuit 44 to park the VCM actuator and head/arm assembly as required by outputting a park signal on park line 58. A $V_{dd}$ sense input 48 provides an external resistor connection for determining whether the source of $V_{dd}$ voltage has dropped below a predetermined trip point. In like manner, $V_{bb}$ sense input 50 provides a point for an external resistor connection to determine whether the source of $V_{bb}$ voltage has likewise fallen below a predetermined trip point.

The output of undervoltage detection and park logic circuit 44 appearing as park signal on park line 58 is applied as one input to switching device 64 and simultaneously provides a controlling input to switching devices 16 and 56.

Park DAC 52, as controlled by the data processor of the servo system of which VCM control circuit 10 forms a part, provides an analog output signal on park DAC output line 54 for input to one terminal of switching device 56. The common terminal of switching device 56 is coupled by means of CPARK line 74 to an output of VCM control circuit 10 for charging an external capacitor (shown in phantom) coupled thereto as will be more fully described hereinafter. An additional terminal of switching device 56 is coupled through amplifier 60 to a remaining terminal of switching device 16 as shown.

An additional input to VCM control circuit 10 is provided on brake delay line 62 for controlling switching device 64 in response to signals from the servo system of which VCM control circuit 10 forms a part thereof. An additional terminal of switching device 64 is connected through internal resistor 68 to a brake delay pad 66. As shown, brake delay pad 66 is connected to the computer mass storage device spindle predriver stage to provide a brake signal as more fully described in the co-pending application for "SPINDLE MOTOR CONTROL CIRCUIT AND METHOD FOR SERVO SYSTEM CONTROL IN A COMPUTER MASS STORAGE DEVICE", filed concurrently herewith. An internal capacitor 70 couples the brake delay pad 66 to circuit ground. Brake delay pad 66 is utilized to connect an external capacitor to change the internal time constant which would start spindle braking action of the computer mass storage device as enabled by the signal on brake delay line 62 through switching device 64. An additional controlling input to VCM control circuit 10 is applied on V_EXGM input line 72 to control switching device 18. The signal on V_EXGM input line 72 enables switching device 18 to control the transconductance of the VCM by means of an external resistor which may be connected between RGM$_x$ input line 76 and input node 22 at the VCM compensation 1 ("VCOMP1") input shown.

An additional input to VCM control circuit 10 is a VCM compensation 2 ("VCOMP2") input coupled to output line 26. The VCOMP1 and VCOMP2 inputs to VCM control circuit 10 allow selective compensation for the voice coil motor to be effectuated through the connection of external components to the VCM control circuit 10. An additional enabling input to amplifier 24 is supplied on VBEMF input line 94 to couple the generated back EMF ("BEMF") voltage from the spindle system as is more fully described in the aforementioned co-pending application filed on even date herewith.

Still further inputs to VCM control circuit 10 include a VSEN+ input 78 and VSEN− input 80 connected to the parallel connected inputs of amplifiers 82 and 84. The VSEN+ input 78 and VSEN− input 80 are the positive and negative connections respectively to the sense resistor of the VCM power stage as will be more fully described hereinafter. The output of amplifier 82 is supplied on sense feedback line 88 through resistor 90 to input node 22 of amplifier 24. Similarly, the output of amplifier 84, which has its gain controlled by the input signal appearing on V_SENGN input line 86, appears on ADC CH7 line 92 for input to the analog-to-digital converter ("ADC") section of the disk drive servo system as more fully described in the aforementioned co-pending applications.

With reference additionally now to FIG. 2, the power stage 100 of the VCM control circuit 10 is shown. Power stage 100 comprises an "H" switch circuit comprising transistors 102, 104, 106 and 108. Series connected transistors 102 and 104 couple a source of V$_{dd}$ voltage to circuit ground and have an intermediate node therebetween coupled to CMP output line 34. In like manner, the series connection of transistors 106 and 108 couple V$_{dd}$ to circuit ground and have an intermediate node therebetween coupled to CMN output line 40. In the embodiment of power stage 100 shown, transistors 102 and 106 may be P channel transistors and transistors 104 and 108 may be N channel transistors.

Input to power stage 100, as depicted in this simplified representation of the linear signal path from VCM DAC 12, is supplied through the circuitry previously described with respect to FIG. 1, which are herein represented with only an inverter 116, to amplifiers 28 and 30 as previously described. The output of VCM DAC 12, in the embodiment of FIG. 2 herein shown as a node 114, provides a driving signal to amplifier 30 while the output terminal of inverter 116 defined as node 118 provides an inverted driving signal to amplifier 28.

VPP output line 32 drives the gate of transistor 102 while the VNP output line 36 drives the gate of transistor 104. The CMP output line 34 is utilized to directly drive the voice coil motor 110 which is connected in series with resistor 112 across the "H" circuit defined by transistors 102, 104, 106 and 108.

Similarly, the VPN output line 38 drives the gate of transistor 106 while the VNN output line 42 drives the gate of transistor 108. The CMN output line 40 is connected to the "H" switch circuit at its connection with resistor 112 as shown. In operation, the function of the "H" switch circuit of power stage 100 functions to bi-directionally steer voltage through voice coil motor 110 by activating, for example, transistor 102 in conjunction with transistor 108 or transistor 106 in conjunction with transistor 104 while directly driving the voice coil motor 110 through selective use of CMP output line 34 and CMN output line 40. Current through the voice coil motor 110 is sensed by the voltage drop across resistor 112 on VSEN+ input line 78 and VSEN− input line 80 as input to amplifier 82 as previously described. The output of amplifier 82 is fed back to the input of the amplifier stage of the VCM control circuit 10 at the output of VCM DAC 12 as previously described.

In operation, the VCM control circuit 10 in conjunction with the spindle motor BEMF will provide the necessary current to the voice coil motor 110 to park the disk drive actuator and head assembly in the event of an undervoltage condition as sensed by undervoltage detection and park logic circuit 44. The servo system data processor, as described in the aforementioned co-pending applications, is always aware of the position of the disk drive heads with respect to the rotating disk surfaces. In addition, it is also continuously updated as to the relative movement of the disk drive heads with respect to the disk inner diameter ("ID") and disk outer diameter ("OD"). Therefore, should the head parking area for the disk drive be adjacent the disk ID, as is most often the case, the servo system data processor is aware of the radial distance of the heads from that particular area as well as any then current motion towards or away from the head parking area.

Utilizing this information, the data processor continually provides digital information to park DAC 52 to charge, for example, a capacitor connected to the VCM control circuit 10 CPARK line 74 through switching device 56 while in the position shown in FIG. 1. By continually updating the voltage to this external capacitor, park DAC 52 insures that this capacitor has the correct charge stored to serve as an initial condition reference to allow the spindle motor BEMF to move the voice coil motor 110, in conjunction with the actuator and head assembly, to the disk parking zone when a park signal on park line 58 from undervoltage detection and park logic circuit 44 causes the switching device 56 to connect the CPARK line 74 through amplifier 60 to switching device 16. In this manner, the initial condition reference charge stored on the external capacitor connected to CPARK line 74 in conjunction with the spindle motor BEMF will provide sufficient power through amplifier 24 to enable the power stage 100 of FIG. 2 to cause the voice coil motor 110 to move an appropriate distance in the proper direction and then decelerate properly to allow the disk drive heads to land on the disk surface adjacent the disk ID as the spindle motor is braked to stop the rotation of the disk media.

In conjunction with the function of park DAC 52, the VBEMF input 94 to amplifier 24 insures that sufficient power is received by the amplifier 24 and the remainder of the VCM control circuit 10 analog circuitry from the BEMF of the spindle motor as it winds down and stops its rotation. It should be noted that while the operation of the parking technique for the VCM control circuit 10 has been described with respect to a capacitor connected to CPARK line 74, other means for maintaining an initial condition reference signal level proportional to the distance and relative velocity of the head actuator assembly with respect to the disk parking area may be utilized in place thereof. Other implementations currently contemplated would include the use of a latch in lieu of an external capacitor.

Undervoltage detection and park logic circuit 44 will provide the park signal on park line 58 in response to various conditions, for example, should the data processor of the servo system request that the voice coil motor 110 park the head actuator assembly, a park bit may be set providing a park input 46 causing, for example, switching device 56 to connect CPARK line 74 to the input of amplifier 60 as previously described. In addition, a detection of an undervoltage condition on $V_{dd}$ sense input 48 (for example, a 12 volt supply line) or a low voltage condition sensed on $V_{bb}$ sense input 50 (for example, a 5 volt supply line) will likewise be sensed as an undervoltage condition causing undervoltage detection and park logic circuit 44 to initiate parking of the actuator/head assembly by driving voice coil motor 110 in accordance with the stored output of park DAC 52.

With respect to the power stage 100, a significant problem with conventional voice coil motor control systems is that of crossover distortion caused by an offset in the voice coil motor DAC resulting in a positive voltage at the input node of the equivalent of amplifier 24. This offset and resultant voltage means that the current in the voice coil motor can never be reduced to zero causing significant problems in the overall servo system. Conventional techniques which force this offset to be equal to or less than zero result in a "dead band" wherein the voice coil motor cannot be actuated over some range of inputs. By utilizing the power stage 100 of the VCM control circuit 10 of the present invention to approximate a class AB power stage, current can be driven into the voice coil motor 110 by pushing current through amplifier 28 at the same time current is pulling down through amplifier 30. In this manner, the gates of transistors 102, 104, 106 and 108 are always driven symmetrically thereby limiting crossover distortion and avoiding "dead band" problems.

Brake delay line 62 provides an input to VCM control circuit 10 in response to a bit set by the servo system data processor which functionally controls switching device 64 to initiate a dynamic braking of the disk drive spindle motor as determined by a particular application of the disk drive servo system. The brake delay pad 66 allows the connection of an external capacitor to change the speed of the dynamic braking by placing the same in parallel with internal capacitor 70.

The VCOMP1 and VCOMP2 inputs to VCM control circuit 10 connected to input node 22 and output line 26 of amplifier 24 respectively, allow for compensation for poles in the overall system transfer function which result from the presence of the voice coil motor 110 inductance and series resistor 112. A resistor and capacitor may be placed in parallel with amplifier 24 to provide compensation for the phase lag caused by such poles. By placing the compensation directly around the amplifier 24, smaller values of resistance and capacitors may be utilized to provide compensation.

$RGM_x$ input 76 in conjunction with VCOMP1 connected to input node 22 allow the connection of an external resistance therebetween to change the transconductance of the system by, essentially, placing such external resistance in parallel with resistor 20 to change the gain of the overall power amplifier.

While there have been described above the principles of the present invention in conjunction with specific apparatus, it is to be clearly understood that the foregoing description is made only by way of example and not as a limitation to the scope of the invention.

What is claimed is:

1. A voice coil motor control circuit for a servo control system of a computer mass storage device disk drive, said servo control system including a data processor and a voice coil motor digital-to-analog converter responsive thereto for supplying a predetermined current level to a voice coil motor power stage for bidirectionally controlling a data transducer and actuator arm assembly coupled to said voice coil motor with respect to a rotating storage medium, said voice coil motor control circuit further including an undervoltage detection circuit for providing a park control signal indicative of a supply voltage to said voice coil motor control circuit falling below a predetermined level thereof and said servo control system providing positioner information to said data processor with respect to a current position and relative velocity of said data transducer and actuator arm assembly with respect to a parking position thereof on said storage medium, the improvement in combination, comprising:

an additional digital-to-analog converter responsive to said data processor for producing an output signal proportional to an electrical energy necessary to move said data transducer and actuator arm assembly from said current position thereof to said parking position on said storage medium wherein said output signal changes in value as said current position and said relative velocity of said data transducer and actuator arm assembly changes; and a signal storage system for storing said output signal proportional to the electrical energy necessary to move said data transducer and actuator arm assembly from said current position thereof to said parking position produced by said additional digital-to-analog converter and supplying said output signal level to said voice coil motor power stage in response to said park control signal.

2. The voice coil motor control circuit of claim 1 wherein said output signal produced by said additional analog-to-digital converter is a voltage level proportional to said energy necessary to move said data transducer and actuator arm assembly from said current position to said parking position.

3. The voice coil motor control circuit of claim 1 wherein said signal storage system comprises a capacitor.

4. The voice coil motor control circuit of claim 3 further comprising a switching device wherein said switching device is responsive to said park control signal for coupling said capacitor to said voice coil motor control circuit.

5. The voice coil motor control circuit of claim 1 wherein said voice coil motor power stage comprises:
first and second series connected transistors having a first intermediate node therebetween coupling a first voltage line to a second voltage line;
third and fourth series connected transistors in parallel with said first and second series connected transistors coupling said first voltage line to said second voltage line and having a second intermediate node therebetween, said voice coil motor being coupled between said first and second intermediate nodes; and
first and second amplifiers for providing a driving signal to control terminals of said first, second, third and fourth transistors and said first and second intermediate nodes for selectively coupling said voice coil motor between said first and second voltage lines.

6. The voice coil motor control circuit of claim 5 wherein said first and second amplifiers are respectively operative to alternately supply and sink a current through said voice coil motor.

7. The voice coil motor control circuit of claim 5 further comprising a feedback path from said voice coil motor to an input of said voice coil motor power stage.

8. The voice coil motor control circuit of claim 7 wherein said feedback path comprises a sense resistor in series with said voice coil motor between said first and second intermediate nodes.

9. The voice coil motor control circuit of claim 8 wherein said feedback path further comprises an amplifier having first and second inputs thereof in parallel with said sense resistor and an output thereof coupled to said input of said voice coil motor power stage.

10. The voice coil motor control circuit of claim 9 wherein said output of said amplifier is resistively coupled to said input of said voice coil motor power stage.

11. The voice coil motor control circuit of claim 1 further comprising means for selectively altering a transconductance factor of said voice coil motor power stage.

12. The voice coil motor control circuit of claim 1 further comprising means coupled to a spindle motor of said disk drive for supplying a back EMF voltage to said voice coil motor power stage during braking of said spindle motor.

13. A method for controlling a voice coil motor in a servo system of a computer mass storage disk drive in response to a park control signal, wherein said servo system contains positioner information with respect to a current position and relative velocity of a data transducer and actuator arm assembly positioned by said voice coil motor with respect to a storage medium, said method comprising the steps of:
reading said positioner information;
comparing said positioner information with a predetermined parking position of said data transducer and actuator arm assembly;
determining an amount of energy necessary to move said data transducer and actuator arm assembly to said predetermined parking position on said storage medium from said current position thereof;
computing a digital signal representative of said amount of energy;
inputting said digital signal to a digital-to-analog converter to produce an output signal proportional to said digital signal;
storing current values of said output signal; and
applying drive signals proportional to said current values of said output signal stored during said step of storing to said voice coil motor in response to said park control signal.

14. The method of claim 13 wherein said steps of reading, comparing, determining, computing and inputting are carried out by means of a data processor.

15. The method of claim 13 wherein said step of storing is carried out by a capacitor coupled to an output of said digital-to-analog converter.

16. The method of claim 13 wherein said step of applying is carried out by means of a switching device responsive to said park control signal for coupling said output signal to said voice coil motor.

17. A voice coil motor control circuit for a servo control system of a computer mass storage device disk drive, said servo control system including a data processor and a voice coil motor digital-to-analog converter responsive thereto for supplying a predetermined current level to a voice coil motor power stage for bidirectionally controlling a data transducer and actuator arm assembly coupled to said voice coil motor with respect to a rotating storage medium, said voice coil motor control circuit further including an undervoltage detection circuit for providing a park control signal indicative of a supply voltage to said voice coil motor control circuit falling below a predetermined level thereof and said servo control system providing information to said data processor with respect to a current position and relative velocity of said data transducer and actuator arm assembly with respect to a parking position thereof, the improvement in combination, comprising:
means responsive to said data processor for producing an output signal proportional to an electrical energy necessary to move said data transducer and actuator arm assembly from said current position thereof to said parking position; and
means for storing current values of said output signal from said means for producing the output signal; and
means for supplying a drive signal of a signal level proportional to said output signal stored by said means for storing to said voice coil motor power stage in response to said park control signal.

18. The voice coil motor control circuit of claim 17 wherein said output signal is a voltage level proportional to said energy necessary to move said data transducer and actuator arm assembly from said current position to said parking position.

19. The voice coil motor control circuit of claim 17 wherein said storing means comprises a capacitor.

20. The voice coil motor control circuit of claim 19 further comprising a switching device responsive to said park control signal for coupling said capacitor to said voice coil motor power stage.

21. A voice coil motor power stage for a voice coil motor control circuit in a servo control system of a computer mass storage device disk drive wherein said servo control system includes a data processor and a voice coil motor digital-to-analog converter responsive thereto for generating analog signals which cause a current of a selected current level to be supplied to said voice coil motor through said voice coil motor power stage to position a data transducer and actuator arm assembly with respect to a storage medium, said voice coil motor power stage comprising:
first and second series connected transistors coupling a first voltage line to a second voltage line and having a first intermediate node therebetween;
third and fourth series connected transistors in parallel with said first and second series connected transistors coupling said first voltage line to said second voltage line and having a second intermediate node therebetween, said voice coil motor being coupled between said first and second intermediate nodes;
first and second amplifiers coupled to receive said current of the selected current level caused to be generated by the voice coil motor digital-to-analog converter for providing a driving signal to control terminals of said first, second, third and fourth transistors and said first and second intermediate nodes for selectively coupling said voice coil motor between said first and second voltage lines.

22. The voice coil motor power stage of claim 21 wherein said first and second amplifiers are respectively operative to alternately supply and sink a current through said voice coil motor.

23. The voice coil motor power stage of claim 21 further comprising a feedback path from said voice coil motor to an input of said voice coil motor power stage.

24. The voice coil motor power stage of claim 23 wherein said feedback path comprises a sense resistor in series with said voice coil motor between said first and second intermediate nodes.

25. The voice coil motor power stage of claim 24 wherein said feedback path further comprises an amplifier having first and second inputs thereof in parallel with said sense resistor and an output thereof coupled to said input of said voice coil motor power stage.

26. The voice coil motor power stage of claim 25 wherein said output of said amplifier is resistively coupled to said input of said voice coil motor power stage.

27. The voice coil motor power stage of claim 21 further comprising means for selectively altering a transconductance factor of said voice coil motor power stage.

28. The voice coil motor power stage of claim 21 further comprising means coupled to a spindle motor of said disk drive for supplying a back EMF voltage to said voice coil motor power stage during braking of said spindle motor.

29. A voice coil motor control circuit for a servo control system of a computer mass storage device disk drive, said servo control system including a data processor and a voice coil motor digital-to-analog converter responsive thereto for supplying a predetermined current level to a voice coil motor power stage for bidirectionally controlling a data transducer and actuator arm assembly coupled to said voice coil motor with respect to a rotating storage medium, said voice coil motor control circuit further including an undervoltage detection circuit for providing a park control signal indicative of a supply voltage to said voice coil motor control circuit falling below a predetermined level thereof and said servo control system providing positioner information to said data processor with respect to a current position and relative velocity of said data transducer and actuator arm assembly with respect to a parking position thereof on said storage medium, the improvement in combination, comprising:

an additional digital-to-analog converter responsive to said data processor for producing an output signal proportional to an electrical energy necessary to move said data transducer and actuator arm assembly from said current position thereof to said parking position on said storage medium wherein said output signal changes in value as said current position and said relative velocity of said data transducer and actuator arm assembly changes; and a signal storage system for storing said output signal proportional to the electrical energy necessary to move said data transducer and actuator arm assembly from said current position thereof to said parking position produced by said additional digital-to-analog converter and supplying said output signal level to said voice coil motor power stage in response to said park control signal; and amplifier circuitry coupled to said signal storage system to receive said output signal stored by said signal storage system when said park control signal is generated by said undervoltage detection circuit, wherein said output signal forms an initial condition reference utilized by said amplifier circuitry to generate a power-stage drive signal, proportional in value to said initial condition reference, to be supplied to said voice coil motor power stage to drive the voice coil motor to position said data transducer and actuator arm in a desired position relative to said rotating storage medium.

* * * * *